UNITED STATES PATENT OFFICE.

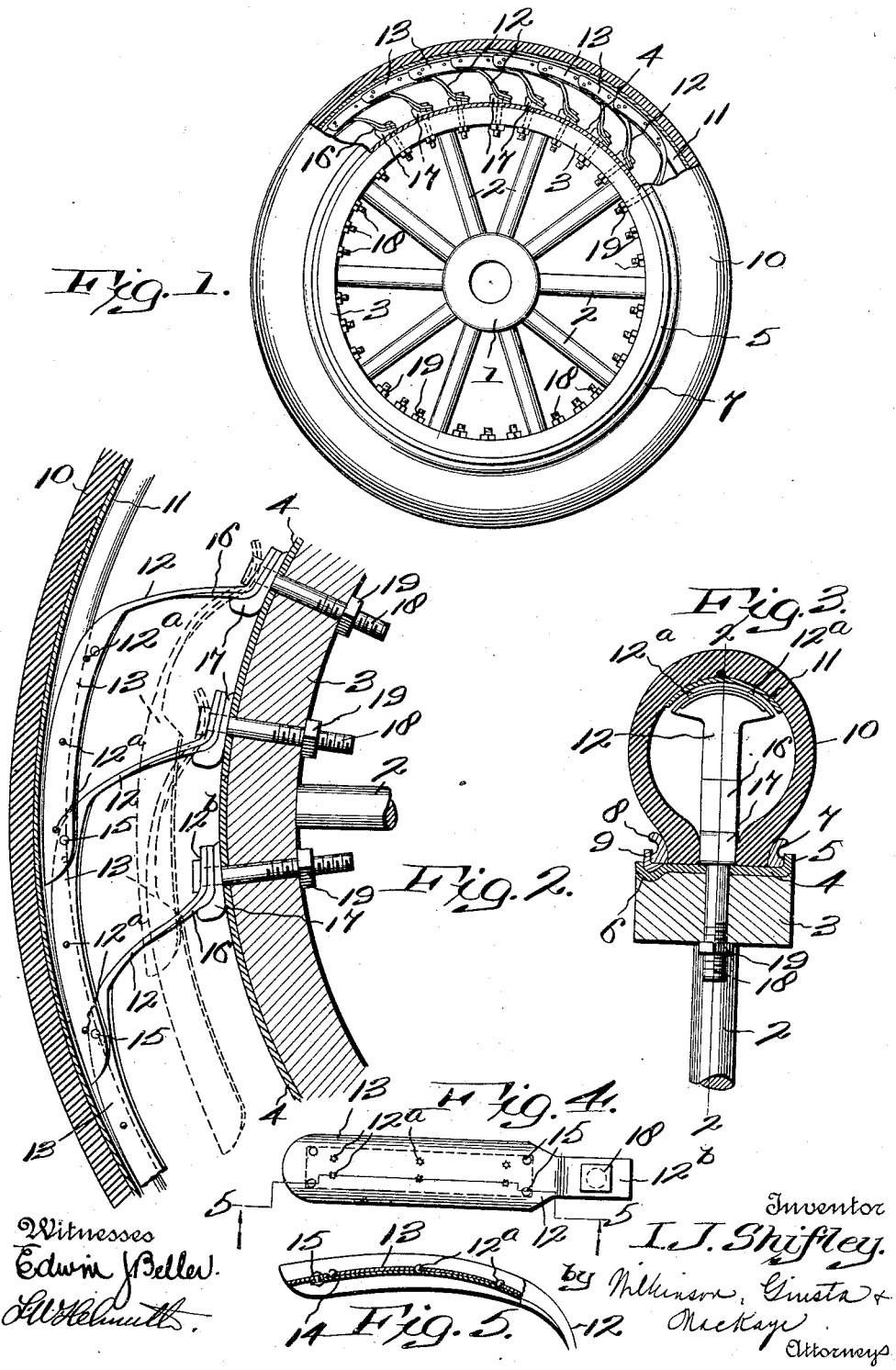

ISAAC JOHN SHIFLEY, OF TAMPA, FLORIDA.

SPRING-TIRE.

1,116,939. Specification of Letters Patent. Patented Nov. 10, 1914.

Application filed September 10, 1913. Serial No. 789,119.

*To all whom it may concern:*

Be it known that I, ISAAC J. SHIFLEY, a citizen of the United States, residing at Tampa, in the county of Hillsboro and State of Florida, have invented certain new and useful Improvements in Spring-Tires; and I do hereby declare the following to be a full, clear, and exact description of the invention, such as will enable others skilled in the art to which it appertains to make and use the same.

My invention relates to improvements in spring tires, and is intended to provide a resilient arrangement carried by the felly band adapted to be used in connection with a tire of rubber, or other material, and which does away with the necessity of a pneumatic inner tube and renders it feasible to employ a tire of cheaper construction than those now generally in use on automobiles, and other like vehicles.

My invention will be understood by reference to the accompanying drawings, in which similar reference symbols indicate corresponding parts in the several views.

Figure 1 is a side elevation of a wheel constructed according to my invention, parts being shown as broken away; Fig. 2 shows a section through the tire and wheel rim along the line 2—2 of Fig. 3, parts being shown in elevation; Fig. 3 shows a cross section through the tire and rim, parts being shown in elevation; Fig. 4 is a detail showing one of the springs detached from the wheel; and Fig. 5 shows a section along the line 5—5 of Fig. 4, and looking in the direction of the arrows.

1 represents the hub of the wheel, 2 the spokes, and 3 the felly band on which the metal band or rim 4 is secured in the usual way. This metal rim 4 is preferably provided with a flange at one side, as at 5, and with a groove 6 at the other side, as shown in Fig. 3. The flange 5 serves as an abutment for the ring 7, and the groove 6 serves to engage the locking ring 9 to hold the other ring 8 in position.

Mounted on the permanent band 4, between the rings 7 and 8, is the tire 10 of rubber, or other similar material, inside of which I provide an arcuate ring 11 serving as an arch to stiffen the tread of the tire. Inside the annular chamber formed by the tire I provide a series of springs 12 having broad arcuate ends 13, as shown, in which ends are held anti-friction balls or rollers 12$^a$, supported beneath by the supporting plate 14 riveted, as at 15, to the ends 13 of the springs 12, and the stems of said springs are bent, as at 12$^b$, and are reinforced, as at 16, see Fig. 2, to engage in chairs 17 held in place by the bolts 18 and nuts 19. When these nuts 19 are screwed down tight, the springs assume the position shown in full lines in Fig. 2, and when the nuts are eased up, the springs will assume the position shown in dotted lines in Fig. 2. Thus to assemble the parts, the springs are put on loosely in the position shown in dotted lines, the tire is slipped in place, the locking rings adjusted, and then the nuts 19 are screwed down tight, causing the springs to take the position shown in full lines in Fig. 2, and furnishing a resilient support for the tread of the tire.

The anti-friction bearings 12$^a$ lessen the friction between the springs and the arcuate ring 11, which braces the inner wall of the tread of the tire. It will be noted that the weight placed on the hub of the wheel will be supported by a plurality of these springs and thus a compound support is secured. It will be obvious that by this arrangement a very thin thickness of rubber, or other material, may be used for the tread of the tire, and in certain cases the rubber sheathing may be done away with entirely, and a tread of metal, canvas, or other suitable material may be used.

It will be obvious that various modifications might be made in the herein described apparatus, and in the construction, combination and arrangement of parts which could be used without departing from the spirit of my invention.

Having thus described my invention, what I claim and desire to secure by Letters Patent of the United States is:—

In a wheel, the combination with a felly and a felly band mounted thereon, of a casing and a tread band inclosed therein, a series of substantially L-shaped metal chairs mounted on said felly band, curved spring arms engaging said chairs, and having their outer ends bearing against said tread band, bolts passing through said felly, said felly band, said chairs and the inner ends of said springs, and nuts inside of said felly for adjusting the tension on said spring arms, substantially as described.

In testimony whereof, I affix my signature, in presence of two witnesses.

ISAAC JOHN SHIFLEY.

Witnesses:
 NOBLE G. TERRELL,
 A. A. MCCRANIE.

Copies of this patent may be obtained for five cents each, by addressing the "Commissioner of Patents, Washington, D. C."